US012768998B2

(12) United States Patent
DelMarco

(10) Patent No.: US 12,768,998 B2
(45) Date of Patent: Oct. 20, 2026

(54) COMPACT PORTABLE NAVIGATION SYSTEM FOR GPS-CHALLENGED REGIONS

(71) Applicant: BAE SYSTEMS Information and Electronic Systems Integration Inc., Nashua, NH (US)

(72) Inventor: Stephen P. DelMarco, North Andover, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 789 days.

(21) Appl. No.: 18/132,533

(22) Filed: Apr. 10, 2023

(65) Prior Publication Data

US 2024/0337749 A1 Oct. 10, 2024

(51) Int. Cl.

*G01S 17/00* (2020.01)
*G01C 3/08* (2006.01)
*G01C 21/16* (2006.01)
*G01S 17/89* (2020.01)
*G06T 7/70* (2017.01)

(52) U.S. Cl.

CPC ................ *G01S 17/89* (2013.01); *G01C 3/08* (2013.01); *G01C 21/1656* (2020.08); *G06T 7/70* (2017.01)

(58) Field of Classification Search

USPC .......................................................... 356/5.01
See application file for complete search history.

(56) References Cited

U.S. PATENT DOCUMENTS 9,766,074 B2 9/2017 Roumeliotis
10,012,504 B2 7/2018 Roumeliotis
10,107,919 B1 10/2018 Chapman et al.
(Continued)

FOREIGN PATENT DOCUMENTS

WO 2016174659 A1 11/2016
WO WO-2022229943 A1 * 11/2022 ......... G02B 27/0093

OTHER PUBLICATIONS

Office Action for U.S. Appl. No. 17/501,824 mail date Jun. 17, 2025, 22 pages.
(Continued)

*Primary Examiner* — James R Hulka
(74) *Attorney, Agent, or Firm* — Maine Cernota & Curran; Gary McFaline

(57) ABSTRACT

A low SWAP-C apparatus and method enable determining precise location and orientation in a GPS-denied environment. A camera image of a scene is registered to a synthetic image predicted according to an initial estimate of location and orientation and a 3D model of the environment to obtain an accurate cross-plane location estimate perpendicular to the camera pointing direction, and an approximate downrange location in the pointing direction. A range sensor is then used to correct and refine the downrange estimate. The steps can be iterated until a required accuracy is attained. The camera can be an electro-optical or infrared imaging system. The range sensor can be a laser range finder or a LIDAR. The initial location estimate can be based on inertial measurements and/or earlier GPS readings. The registration can include applying a photogrammetric bundle-adjustment process. The disclosure is applicable to navigation, weapons pointing, and situational awareness.

20 Claims, 7 Drawing Sheets

(56) References Cited

U.S. PATENT DOCUMENTS

| | | | | |
|---|---|---|---|---|
| 10,151,588 | B1 | 12/2018 | Singh | |
| 10,254,118 | B2 | 4/2019 | Roumeliotis | |
| 10,274,958 | B2 * | 4/2019 | DelMarco | G01C 21/005 |
| 10,325,411 | B1 | 6/2019 | Laney | |
| 10,366,549 | B1 | 7/2019 | Mash | |
| 10,445,616 | B2 * | 10/2019 | Tom | G06V 10/42 |
| 10,694,148 | B1 | 6/2020 | Li | |
| 10,907,971 | B2 | 2/2021 | Roumeliotis | |
| 10,929,713 | B2 | 2/2021 | Chiu | |
| 11,466,990 | B2 | 10/2022 | Roumeliotis | |
| 11,544,161 | B1 | 1/2023 | Yarlagadda | |
| 2004/0050240 | A1 | 3/2004 | Greene | |
| 2007/0070069 | A1 | 3/2007 | Samarasekera | |
| 2010/0295942 | A1 | 11/2010 | Jekel | |
| 2011/0218733 | A1 | 9/2011 | Hamza | |
| 2013/0077890 | A1 * | 3/2013 | Chen | G06T 3/18<br>382/254 |
| 2013/0121525 | A1 * | 5/2013 | Chen | G06T 3/4038<br>382/305 |
| 2013/0124471 | A1 * | 5/2013 | Chen | H04N 23/90<br>707/624 |
| 2013/0130205 | A1 | 5/2013 | Matthews | |
| 2013/0314509 | A1 | 11/2013 | Laine | |
| 2015/0286217 | A1 | 10/2015 | Qian | |
| 2016/0217577 | A1 * | 7/2016 | Tom | G06T 7/32 |
| 2017/0329335 | A1 | 11/2017 | Delmarco | |
| 2018/0091746 | A1 | 3/2018 | Benser | |
| 2018/0262687 | A1 * | 9/2018 | Hildreth | H04N 13/204 |
| 2019/0026958 | A1 * | 1/2019 | Gausebeck | G06T 7/579 |
| 2019/0051056 | A1 | 2/2019 | Chiu | |
| 2019/0368877 | A1 | 12/2019 | O'Shea | |
| 2021/0004933 | A1 * | 1/2021 | Wong | G06T 3/4038 |
| 2021/0048821 | A1 | 2/2021 | Bondurant | |
| 2022/0006557 | A1 | 1/2022 | Pierson et al. | |
| 2024/0329597 | A1 * | 10/2024 | DeWeert | G03H 1/0005 |

OTHER PUBLICATIONS

Notice of Allowance of U.S. Appl. No. 18/474,817, mail date Jan. 8, 2025, 17 pages.

Delmarco, S., Webb, H., and Tom, V., "Spectrally-Shaped Correlation with Application to Image Registration," Proceedings of SPIE, vol. 10993, 2019.

DelMarco, S., Webb, H., and Tom, V., "A Progressive Refinement Approach to Aerial Image Registration Using Local Transform Perturbations," Proceedings of the IEEE International Geoscience and Remote Sensing. Symposium, vol. 2, pp. 1100-1103, 2008.

DelMarco, S., "Multi-Template Image Matching Using Alpha-Rooted Biquaternion Phase Correlation with Application to Logo Recognition," Proceedings of SPIE, vol. 8063, 2011.

DelMarco, S., "Multiple Template-Based Image Matching Using Alpha-Rooted Quaternion Phase Correlation," Proceedings of SPIE, vol. 7708, 2010.

DelMarco, S., "Logo Recognition Using Alpha-Rooted Phase Correlation in the Radon Transform Domain," Proceedings of SPIE, vol. 7443, 2009.

DelMarco, S., Tom, V., Webb, H., and Lefebvre, D., "A Verification Metric for Multi-Sensor Image Registration," Proceedings of SPIE, vol. 6567, 2007.

DelMarco, S., Webb, H., and Tom, V., "Automatic Spatial Accuracy Estimation for Correlation-Based Image Registration," Proceedings of SPIE, vol. 10993, 2019.

Naman Patel et al. "Sensor Modality Fusion with CNNs for UGV Autonomous Driving Indoor Environments" 8 pages.

Shahram Moafipoor et al. "LiDAR/Camera Point & Pixel Aided Autonomous Navigation" LiDAR Magazine, vol. 7 No. 7, 7 pages, https://lidarmag.com/2017/10/25/lidarcamera-point-pixel-aided-autonomous-navigation/.

Qi Kong et al. "Outdoor real-time RGBD sensor fusion of stereo camera and sparse lidar" (2022) J. Phys.: Conf. Ser. 2234 012010, doi:10.1088/1742-6596/2234/1/012010.

Darshan Bhanushali et al. "LiDAR-Camera Fusion for 3D Object Detection" in Proc. IS&T Int'l. Symp. on Electronic Imaging: Autonomous Vehicles and Machines, 2020, pp. 257-1-257-9, https://doi.org/10.2352/ISSN.2470-1173.2020.16.AVM-257.

Yilin Zhang "LIDAR—camera deep fusion for end-to-end trajectory planning autonomous vehicle" 2022 J. Phys.: Conf. Ser. 2284 012006, retrieved from the internet: https://iopscience.iop.org/article/10.1088/1742-6596/2284/1/012006, DOI: 10.1088/1742-6596/2284/1/012006.

Anderson Lebbad, C. Nataraj "A Bayesian Algorithm for Vision Based Navigation of Autonomous Surface Vehicles" 2015 IEEE 7th International Conference on Cybernetics and Intelligent Systems (CIS) and IEEE Conference on Robotics, Automation and Mechatronics (RAM), Siem Reap, Cambodia, 2015, pp. 59-64, doi: 10.1109/ICCIS.2015.7274597.

"A Novel Approach for Fusing LIDAR and Visual Camera images in Unstructured environment" International Conference on Advanced Computing and Communication Systems (ICACCS-2017), Jan. 6-7, 2017, Coimbatore, India.

Qingquan Li et al. "A Sensor-Fusion Drivable-Region and Lane-Detection System for Autonomous Vehicle Navigation in Challenging Road Scenarios" IEEE Transactions on Vehicular Technology, vol. 63, No. 2, p. 540-555, Feb. 2014.

"Sebastion Schneider et al.""Fusing Vision and LIDAR—Synchronization, Correction and Occlusion Reasoning"" 2010 IEEE Intelligent Vehicles SymposiumUniversity of California, San Diego, CA, USA Jun. 21-24, 2010, 6 pages".

Xiangmo Zhao et al. "Fusion of 3D LIDAR and Camera Data for Object Detection in Autonomous Vehicle Applications" IEEE Sensors Journal, vol. 20, No. 9, May 1, 2020, 13 pages.

Hyunggi Jo et al. "New Monte Carlo Localization Using Deep Initialization: A Three-Dimensional LiDAR and a Camera Fusion Approach" vol. 8 2020, School of Electrical and Electronic Engineering, Yonsei University, Seoul 03722, South Korea.

Qingqu Wang et al. "On SLAM Based on Monocular Vision and Lidar Fusion System" 2018 IEEE CSAA Guidance, Navigation and Control Conference (CGNCC), Xiamen, China, 2018, pp. 1-5, doi: 10.1109/GNCC42960.2018.9018987.

Jing Li et al. "OpenStreetMap-Based Autonomous Navigation for the Four Wheel-Legged Robot Via 3D-Lidar and CCD Camera" in IEEE Transactions on Industrial Electronics, vol. 69, No. 3, pp. 2708-2717, Mar. 2022, doi: 10.1109 TIE.2021.3070508.

Mao Shan et al "Probabilistic Egocentric Motion Correction of Lidar Point Cloud and Projection to Camera Images for Moving Platforms" 2020 IEEE 23rd International Conference on Intelligent Transportation Systems (ITSC), Rhodes, Greece, 2020, pp. 1-8, doi: 10.1109/ITSC45102.2020.9294601.

Cesar Debeunne et al. "A Review of Visual-LiDAR Fusion based Simultaneous Localization and Mapping" Published Apr. 7, 2020, retrieved from the internet www.mdpi.com/journal/sensors, Sensors 2020, 20, 2068; doi:10.3390/s20072068.

Shi-Sheng Huang et al. "Lidar-Monocular Visual Odometry using Point and Line Features" 2020 IEEE International Conference on Robotics and Automation (ICRA), Paris, France, 2020, pp. 1091-1097, doi: 10.1109/ICRA40945.2020.9196613.

Johannes Graeter et al. "LIMO: Lidar-Monocular Visual Odometry" 2018 IEEE/RSJ International Conference on Intelligent Robots and Systems (IROS), Madrid, Spain, 2018, pp. 7872-7879, doi: 10.1109/IROS.2018.8594394.

Young-Sik Shin et al. "Direct Visual SLAM using Sparse Depth for Camear-LiDAR System" 2018 IEEE International Conference on Robotics and Automation (ICRA), Brisbane, QLD, Australia, 2018, pp. 5144-5151, doi: 10.1109/ICRA.2018.8461102.

Ben Mildenhall et al. "NeRF: Representing Scenes as Neural Radiance Fields for View Synthesis" 17 pages.

Stephan J. Garbin et al. "FastNeRF: High-Fidelity Neural Rendering at 200FPS" 2021 IEEE/CVF International Conference on Computer Vision (ICCV), Montreal, QC, Canada, 2021, pp. 14326-14335, doi: 10.1109/ICCV48922.2021.01408.

Sara Fridovich-Keil et al. "Plenoxels: Radiance Fields without Neural Networks" 2022 IEEE/CVF Conference on Computer Vision and Pattern Recognition (CVPR), New Orleans, LA, USA, 2022, pp. 5491-5500, doi: 10.1109/ICVPR52688.2022.0054.

(56) References Cited

OTHER PUBLICATIONS

"Stephen Delmarco et al. ""High-Precision Infantry Training System (HITS)"" Proceedings of the 33rd International Technical Meeting of the Satellite Division of The Institute of Navigation (ION GNSS+ 2020), Sep. 2020, pp. 2579-2589.https://doi.org/10.33012/2020.17741".

"Stephen Delmarco, Helen Webb, Victor Tom ""Automatic Spatial Accuracy Estimation Correlation-based Image Registration"" Proc. SPIE 10993,Mobile Multimedia/Image Processing, Security, and Applications 2019, 1099307 (May 13, 2019); doi: 10.1117/12.2518183".

"Stephen Delmarco, Helen Webb, Victor Tom ""Spectrally-shaped Correlation With Application to Image Registration"" Proc. SPIE 10993, Mobile Multimedia/Image Processing, Security, and Applications 2019, 1099306 (May 13, 2019); doi: 10.1117/12.2518171".

* cited by examiner

COMPACT PORTABLE NAVIGATION SYSTEM FOR GPS-CHALLENGED REGIONS

STATEMENT OF GOVERNMENT INTEREST

The present invention was made under Contract No. W912CG 21 C 0007 awarded by U.S. Army Research Laboratory, and the United States Government has certain rights in this invention.

FIELD

The disclosure relates to navigational systems, and more particularly to systems that function as alternatives to global positioning systems (GPS) to accurately determine a user's location and orientation.

BACKGROUND

Global Positioning Systems (GPSs) have become a very widely used and very accurate tool for determining the location of a user. If a user is in motion, a GPS can also accurately determine the direction of movement, and hence the orientation, of the user. GPS systems are small, durable, reliable, low in cost, and consume little power. This is sometimes referred to as having a small "SWAP-C," which refers to having reduced Size, Weight and Power—and Cost.

GPSs are used as navigation devices both for civilian and for military applications, including both dismounted persons and vehicles, where the term "vehicle" is used herein generically to refer to both manned and unmanned aircraft and surface (ground and water) vehicles, unless otherwise specified or required by context. In addition, for military applications, GPS systems, in combination with electro-optical or infrared imaging systems and range finding devices, such as laser range finders, can be critical to the accurate pointing of weaponry toward desired targets.

However, there are circumstances under which GPSs are of limited usefulness, or cannot be used at all. For example, a military operation may take place in a contested environment where GPS signals are jammed, or otherwise denied, by a near-peer adversary. In addition, there are environments, such as in canyons and among tall buildings in urban centers, where GPS navigation is only intermittently available, or not available at all, due to obstructions that block or degrade GPS signals. This can be especially problematic for autonomous vehicles and aircraft, both civilian and military, as well as for dismounted soldiers.

In virtually all cases, even when GPS is not available, an estimate can be made of a user's location, for example based on readings from an inertial measurement unit (IMU), possibly in combination with a most-recent successful GPS reading. However, these estimates may not be sufficiently accurate to enable efficient navigation or accurate targeting of weaponry.

One approach to improving the accuracy of a position estimate, when GPS is not available, is to attempt to derive accurate location information from an imaging system such as an infrared or electro-optical imaging device. Often, three-dimensional models of an environment can be made available that designate the accurate locations of all of the significant features in the environment. These can be prepared by surveys performed in advance, for example by autonomous drones or by surveying vehicles, among other methods. They may be provided, for example, as a mesh model or a 3D point cloud derived from a prior LIDAR (Light Detection and Ranging) scan of the area.

The position and orientation of a user can sometimes be accurately determined by deploying two imaging systems (cameras) spaced apart by a known distance to obtain a three-dimensional image of a scene, and then directly comparing it with a 3D model of the environment to estimate user location and orientation. According to this approach, the stereo optical triangulation that arises from comparing the images obtained by two spaced-apart cameras enables the downrange coordinates of imaged objects to be estimated, in addition to their apparent planar locations in each image. However, while somewhat effective, the downrange accuracy of this approach is limited by the separation between the cameras, and may not be sufficiently accurate for estimating the downrange locations of distant objects. Furthermore, an apparatus that includes two, spaced-apart cameras can be bulky and costly, and may not be practical for applications such as small, light, unmanned aerial vehicles (UAVs) and dismounted soldiers, that require a highly portable, low SWaP-C solution.

If SWaP-C requirements only permit one camera to be used, it can be difficult to determine the downrange position offsets in the resulting images. Estimates based on changes in image scale can be obtained by applying a parameter search over scale in which image registration is performed for each scale parameter value. However, this additional search loop adds significant computational expense, which can be impractical for implementation on platforms that require a small SWAP-C. Another approach is to derive position estimates from observations of specially-crafted visual features that provide tolerance-to-scale differences, for example "keypoint" features as are often used in computer vision applications. However, these feature approaches can fail when matching cross-modal imagery, for example IR camera imagery and synthetic range imagery. In such cases, feature-match failures can result from significantly different feature manifestations that can arise because of differing sensor phenomenologies. Other approaches contain LIDAR sensors and use direct 3D-to-3D registration to match the LIDAR data to a 3D model of the site. However, approaches using 3D data matching can be computationally intensive and are unsuitable for low-SWaP-C platforms. Some approaches use depth-based cameras to provide range information associated to each pixel. However, the range extent for these cameras is often severely limited, making them useless for scenarios in which the background is at long range. Furthermore, high illumination conditions, such as in outdoor daytime use, often degrades the performance of these depth-based cameras.

Machine learning-based approaches to determining downrange position offsets can work well, but require massive amounts of training data, and can be brittle when operating on data that has not been seen during the training.

What is needed, therefore, is a low SWAP-C apparatus and method for accurately determining the location and orientation of a user when GPS positioning is limited, intermittent, or unavailable.

SUMMARY

The present disclosure is a low SWAP-C apparatus and method for accurately determining the location and orientation of a user when GPS positioning is limited, intermittent, or unavailable. The disclosed apparatus includes an imaging device, such as an electro-optical imaging device or an infrared imaging device, referred to herein as a "camera." In addition, the disclosed apparatus includes a range-measuring device such as a laser range finder or LIDAR (light detection and ranging), referred to herein as the "range sensor."

It will be understood that, unless otherwise required by context, references to determining the location and orientation of the "user" refer herein to determining the positioning and orientation of a reference frame that is fixed to the camera, under the assumption that the relative position and orientation of the camera and of the "user" of the camera are known. It is also notable that the "user" of the disclosed apparatus is not necessarily a human user. Indeed, embodiments may be deployed on autonomous vehicles under circumstances where humans are not present, and the "user" is the autonomous vehicle.

According to the disclosed method, information derived from the camera is used to accurately determine a "cross-plane" location of the user, i.e. the user's location in a two-dimensional Y-Z plane that is perpendicular to the pointing direction of the camera. An initial estimate of the user's "downrange" location in the pointing or "X" direction is also derived from pointing angles to objects with known locations in the scene. Information from the range sensor is then used to refine and correct the user's downrange location. The disclosed method can thereby be considered a "2+1" approach, in that a two-dimensional location is determined using an image from a camera, and then the third dimension is determined using a range sensor.

In embodiments, little or no hardware is required beyond what is already present in fulfilment of other requirements. For example, the camera and the range sensor may both be part of a pointing system of a weapon carried by a soldier, or mounted on a UAV or other platform. Or, the camera and the range sensor, for example a LIDAR, may be incorporated into a civilian autonomous vehicle as part of a collision avoidance system. Similarly, an IMU that provides an initial estimate of the user's location and orientation may be incorporated together with a GPS in a portable navigation system carried by an individual, a UAV, or a similar platform. In some embodiments, the disclosed method is used to augment the capability of weapon scopes using video cameras and laser range sensors for targeting. Using the method disclosed herein, these systems can be augmented to perform full vision aided navigation, thereby leveraging a pre-existing system to additionally perform navigation in a GPS-challenged region.

According to the present disclosure, a 3D, geo-located "frustum" is generated representing the user's anticipated field of view based on an initial estimate of the location and orientation of the user, and on a geo-located 3D model of the environment. Based on this frustum, and on the estimated location and orientation of the camera, a "synthetic," predicted image is generated, and is compared with an actual image obtained by the camera. According to a "registration" of the two images with each other, the estimate of the user's position and location is adjusted and refined, thereby adjusting and refining the resulting synthetic image, until the correspondence between the camera image and the synthetic image is optimized.

Based on this registration, a crude estimate of the user's "downrange" location in the pointing direction of the camera is derived based on pointing vectors from the estimated camera position through the pixels of the camera image to the known locations of elements in the synthetic image, thereby providing an estimated range value from each pixel to the corresponding point location in the synthetic reference image, and defining a location plane that is perpendicular to the pointing direction. In addition, registration of the camera image with the synthetic image provides a relatively accurate estimate of the orientation and two-dimensional location of the user in this plane, which is referred to herein as the "cross-plane" location and orientation of the user.

Once the cross-plane location and orientation of the user have been determined, the range sensor is used to refine and improve the initial estimate of the user's location in the pointing direction of the camera by minimizing a "cost function" defined on range error values, taking into account that errors in the estimated orientation will result in pixel location errors that contribute to the downrange distance of the scene element that is represented by the pixel. In embodiments, the range sensor is fixed in position and orientation relative to the camera, and pre-calibrated, so that data from the range sensor can be accurately applied to pixels of the camera image.

Once the location and orientation of the user has been accurately determined, it is used to direct movements of the user, i.e. for navigation, and/or for pointing of a directional device such as a projectile weapon.

A first general aspect of the present disclosure is a method of determining a location and orientation within an environment of an apparatus that comprises a controller, a camera, and an associated range sensor, referred to herein as the "position" of the apparatus. The method includes the following steps:

A) determining an initial position estimate of the apparatus;

B) determining by the controller of a 3D geo-located frustum representing an anticipated field of view of the camera, wherein the 3D geo-located frustum is based on the initial position and a three-dimensional geo-located model (3D model) of the environment of the camera;

C) obtaining, by the camera, a camera image of the camera's field of view;

D) generating, by the controller, a synthetic image of the anticipated field of view of the camera, wherein the synthetic image is a prediction of the camera image according to the initial position estimate of the apparatus and the frustum;

E) registering, by the controller, the synthetic image of the anticipated field of view with the camera image, thereby determining an estimate of a "cross-plane" position of the apparatus in a plane perpendicular to a pointing direction of the camera, and a first estimate of a "downrange" position of the apparatus in the pointing direction of the camera, wherein said registering comprises:

a) estimating a geometric transformation between the synthetic image of the anticipated field of view and the camera image of the camera's field of view that optimizes their mutual alignment;

b) revising the position estimate of the apparatus according to the estimated geometric transformation;

c) adjusting the synthetic image according to the revised position estimate; and d) repeating steps a) through c) until a correspondence between the camera image and the synthetic image is optimized;

F) obtaining, by the range sensor, at least one downrange measurement in the pointing direction of the camera;

G) determining, by the controller, a second downrange estimate according to the first downrange estimate and the at least one downrange measurement, the second downrange estimate being more accurate than the first downrange estimate; and H) according to the cross-plane and second downrange estimates, at least one of navigating to a new position, adjusting a location and orientation of a device, and presenting the cross-plane and refined downrange estimates to an operator of the apparatus.

Embodiments further include, between steps G) and H), if an agreement between the camera image and the synthetic image is below a specified threshold, repeating steps D) through G).

In any of the above embodiments, the apparatus can be a vehicle, or in any of the above embodiments, the apparatus can be a weapon, and step H) can include pointing the weapon at a target according to the cross-plane and second downrange estimates.

In any of the above embodiments, the camera can be an electro-optical or infrared imaging system.

In any of the above embodiments, the range sensor can be a laser range finder or a Light Detection and Ranging apparatus (LIDAR).

In any of the above embodiments, step A) can include determining the initial position estimate of the apparatus based, at least in part, on readings from an inertial measurement unit (IMU).

In any of the above embodiments, step A) can include determining the initial position estimate of the apparatus based, at least in part, on a most-recent reading from a global positioning system (GPS).

In any of the above embodiments, in step G), the first estimate of the downrange position can be based on pointing vector angles from the estimated camera position through the pixels of the camera image to known locations of elements in the synthetic image.

In any of the above embodiments, in step E), registering the synthetic image with the camera image can include applying a photogrammetric bundle-adjustment process.

A second general aspect of the present disclosure is a system that includes a camera having a pointing direction and a field of view centered about the pointing direction, a range sensor having a known location and orientation relative to the camera, and a controller configured to cause the camera to obtain a camera image of the field of view centered about the pointing direction, and to cause the range sensor to obtain a downrange measurement in the pointing direction of the camera. The controller being further configured to perform the following steps:

A) receive or determine an initial position estimate of the apparatus;

B) based on the initial position estimate and a three-dimensional geo-located model (3D model) of the environment, determine a 3D, geo-located frustum representing an anticipated field of view of the camera;

C) cause the camera to obtain a camera image of the camera's field of view;

D) generate a synthetic image of the anticipated field of view, wherein the synthetic image is a prediction of the camera image according to the initial position estimate and the frustum;

E) register the synthetic image with the camera image, thereby determining an estimate of a "cross-plane" position of the apparatus in a plane perpendicular to a pointing direction of the camera, and a first estimate of a "downrange" position of the apparatus in the pointing direction of the camera, wherein said registering comprises:

a) estimating a geometric transformation between the synthetic image of the anticipated field of view and the camera image of the camera's field of view that optimizes their mutual alignment;

b) revising the position estimate according to the estimated geometric transformation;

c) adjusting the synthetic image according to the revised position estimate; and d) repeating steps a) through c) until a correspondence between the camera image and the synthetic image is optimized;

F) cause the range sensor to obtain at least one downrange measurement in the pointing direction of the camera;

G) determine a second downrange estimate according to the first downrange estimate and the at least one downrange measurement, the second downrange estimate being more accurate than the first downrange estimate; and H) according to the cross-plane and second downrange estimates, at least one of enable navigating to a new position, enable adjusting of a location and orientation of a device, and present the cross-plane and refined downrange estimates to an operator of the apparatus.

In embodiments, between steps G) and H), if an agreement between the camera image and the synthetic image is below a specified threshold, the controller is further configured to repeat steps D) through G).

In any of the above embodiments the apparatus can be a vehicle, or in any of the above embodiments the apparatus can be a weapon, and step H) can include pointing the weapon at a target according to the cross-plane and second downrange estimates.

In any of the above embodiments, the camera can be an electro-optical or infrared imaging system.

In any of the above embodiments, the range sensor can be a laser range finder or a Light Detection and Ranging apparatus (LIDAR).

In any of the above embodiments, the system can further include an inertial measurement unit (IMU), and in step A) the controller can be configured to determine the initial position estimate of the apparatus based, at least in part, on readings from the IMU.

In any of the above embodiments, the system can further include a global positioning system (GPS), and in step A) the controller can be configured to determine the initial position estimate of the apparatus based, at least in part, on a most-recent reading from the GPS.

In any of the above embodiments, in step E), the controller can be configured to derive the first estimate of the downrange position based on pointing vectors from the estimated camera position through the pixels of the camera image to known locations of elements in the synthetic image.

And in any of the above embodiments, in step E), the controller can be configured to apply a photogrammetric bundle-adjustment process as part of registering the synthetic image with the camera image.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1A:
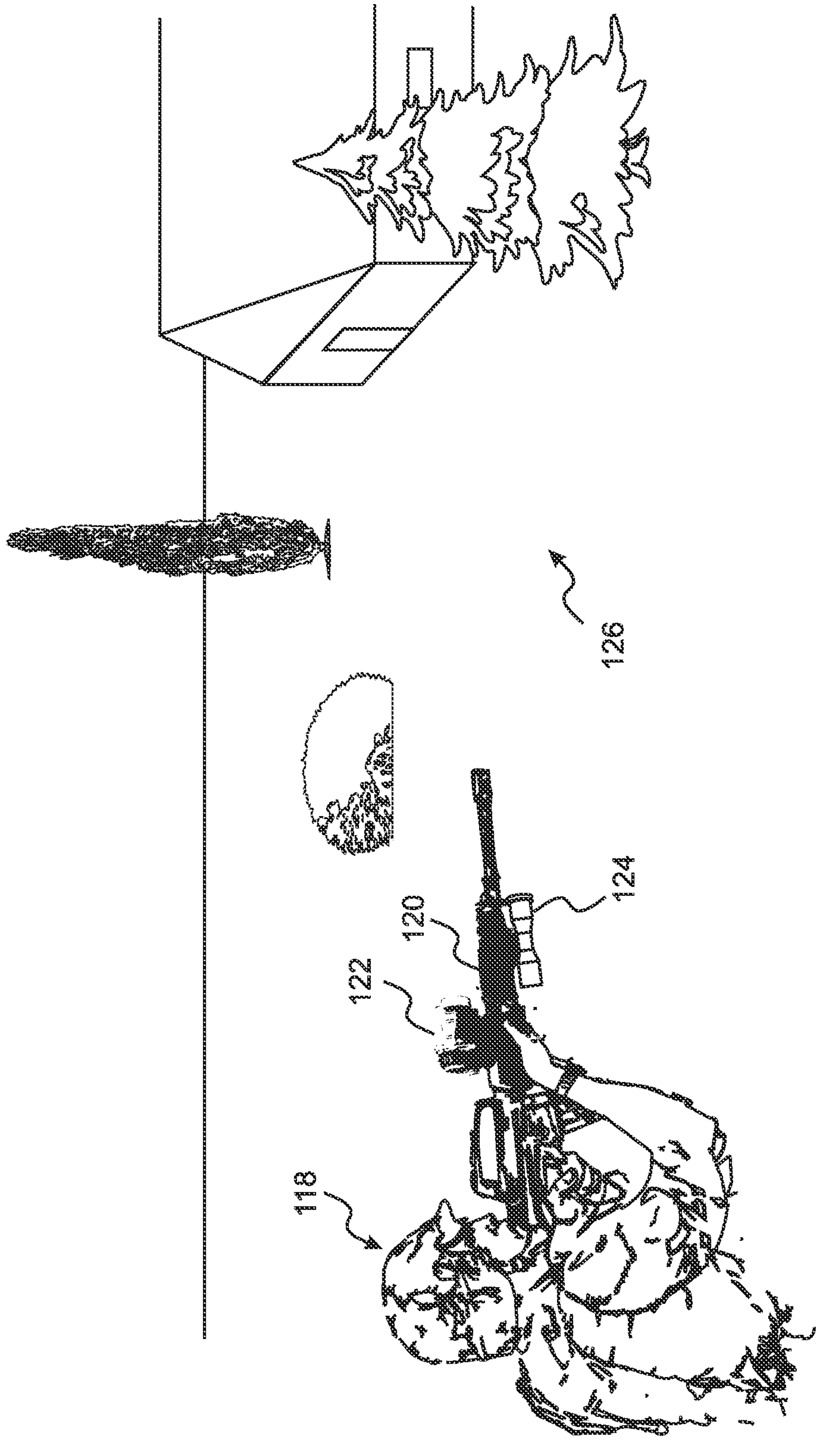
FIG. 1A presents a basic example of the elements and application of the present disclosure.

The present disclosure is a low SWAP-C apparatus and method for accurately determining the location and orientation of a user when GPS positioning is limited, intermittent, or unavailable. With reference to FIG. 1A, the disclosed apparatus 120 includes an imaging device 122, such as an electro-optical imaging device or an infrared imaging device, referred to herein as a "camera." In addition, the disclosed apparatus 120 includes a range-measuring device 124, referred to herein as a "range sensor," such as a laser range sensor or LIDAR (light detection and ranging). In the example of FIG. 1A, the apparatus is a rifle 120 that is carried by a soldier 118 while viewing a scene 126. In other embodiments the apparatus is a vehicle, such as an unmanned aerial vehicle (UAV), or a manned vehicle.

Figure 1B:
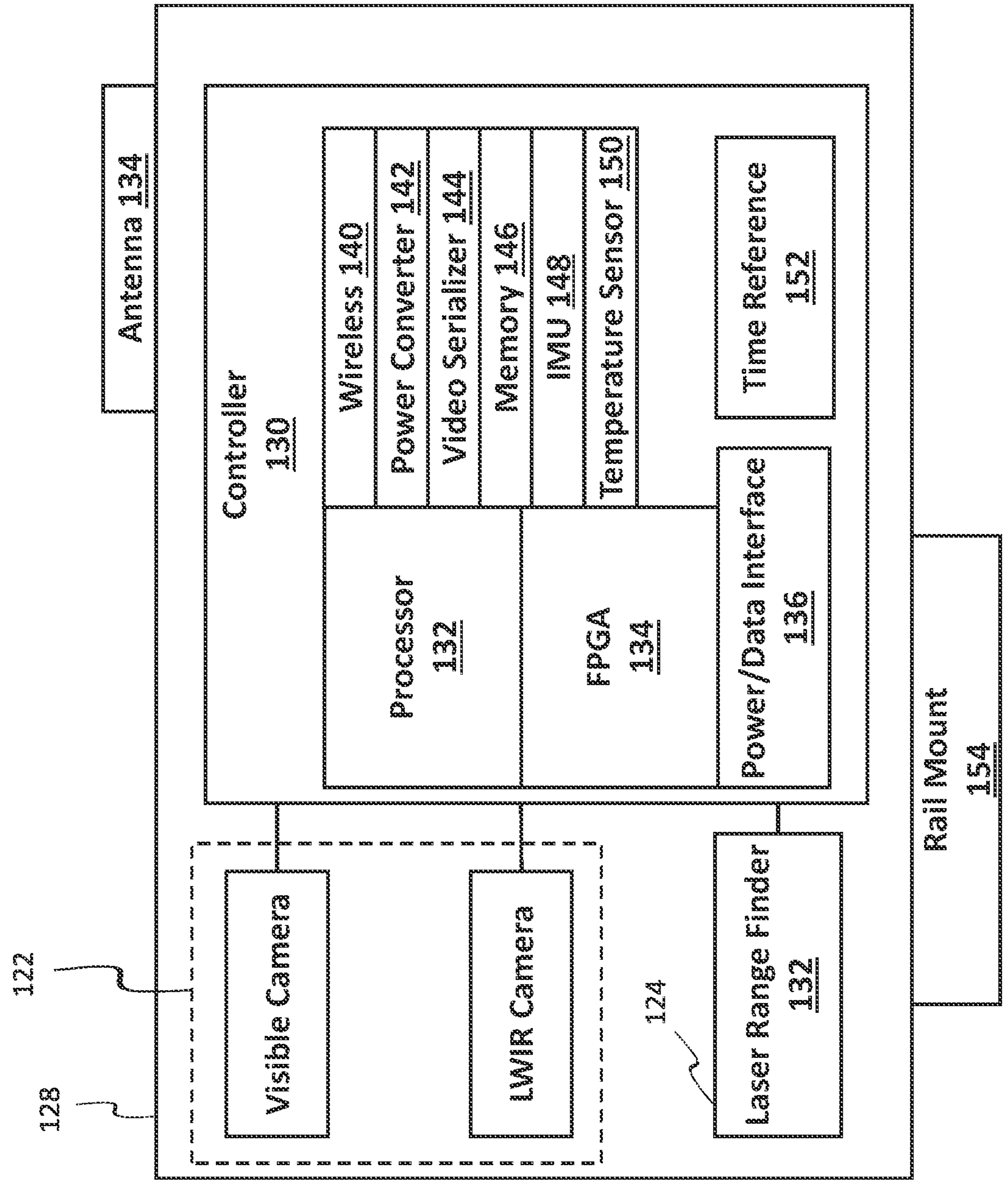
FIG. 1B is a block diagram that illustrates a weapon pointing system in an embodiment of the present disclosure that includes both a camera and a range sensor, together with a controller that is configured to carry out the steps of the disclosed method.

In the embodiment of FIG. 1A, the camera 122 and the range sensor 124 are both part of a pointing system 128 that is mounted by a rail mount 154 to a rifle 120 carried by a soldier 118. In similar embodiments the camera 122 and the range sensor 124 are both mounted on a UAV or other platform. With reference to FIG. 1B, the pointing system 128 of FIG. 1A further comprises a controller 130 that includes a processor 132, a field programmable gate array (FPGA) 134, a power and data interface 136, a wireless communication module (radio) 140, a power converter 142, a video serializer 144, memory 146, an inertial measurement unit 148, a temperature sensor 150, and a time reference 152.

It will be understood that, unless otherwise required by context, references to determining the location and orientation of the "user" refer herein to determining the positioning and orientation of a reference frame that is fixed to the camera, under the assumption that the relative position and orientation of the camera and of the apparatus that is associated with the camera are known. It is also notable that the human "operator" of the disclosed apparatus is not necessarily proximate the apparatus, and may not be monitoring the apparatus in real time. Indeed, embodiments may be deployed on autonomous vehicles under circumstances where humans are not present, and the "apparatus" is the autonomous vehicle.

Figure 1C:
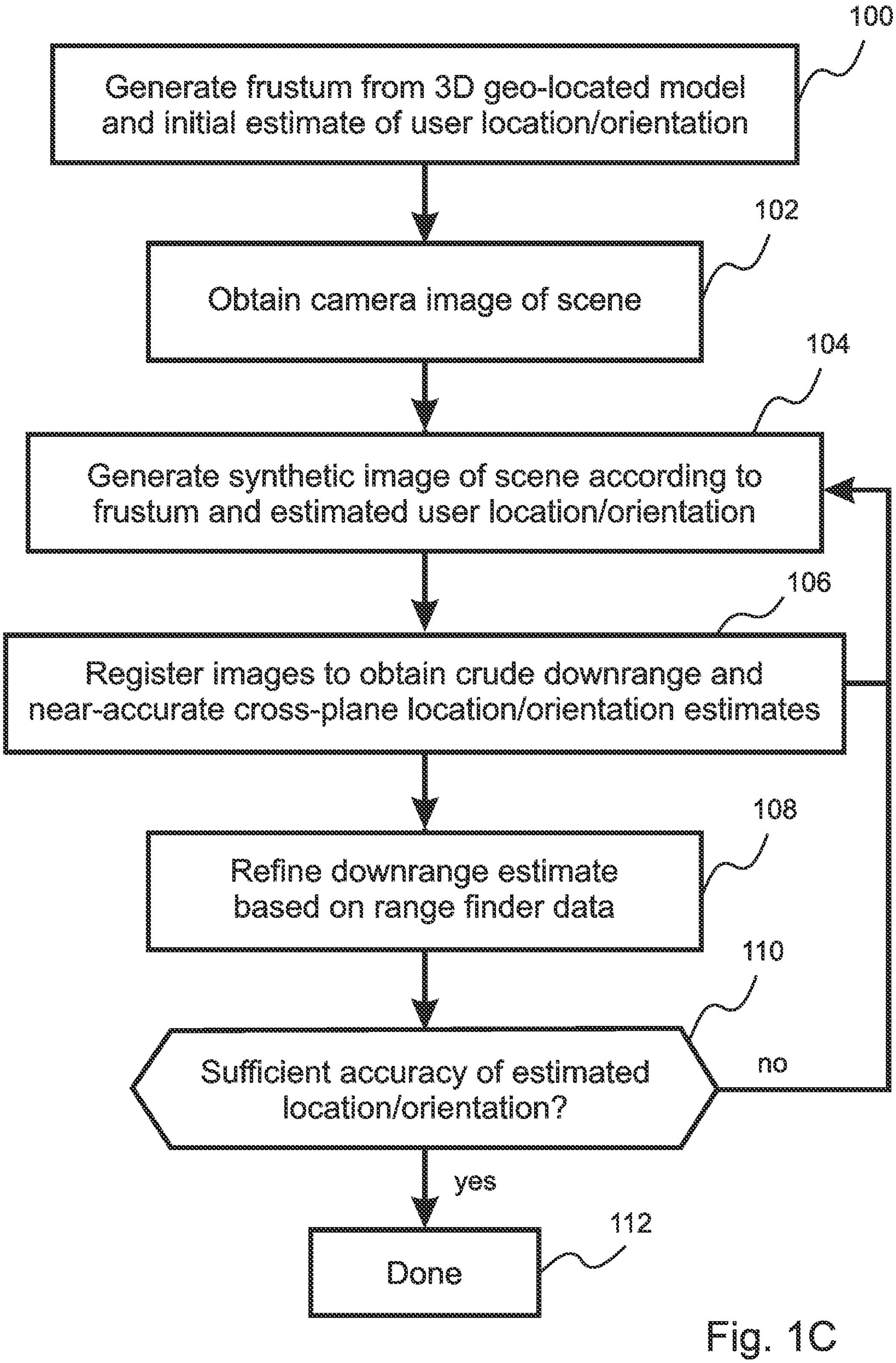
FIG. 1C is a flow diagram that illustrates a method embodiment of the present disclosure.
Figure 1D:
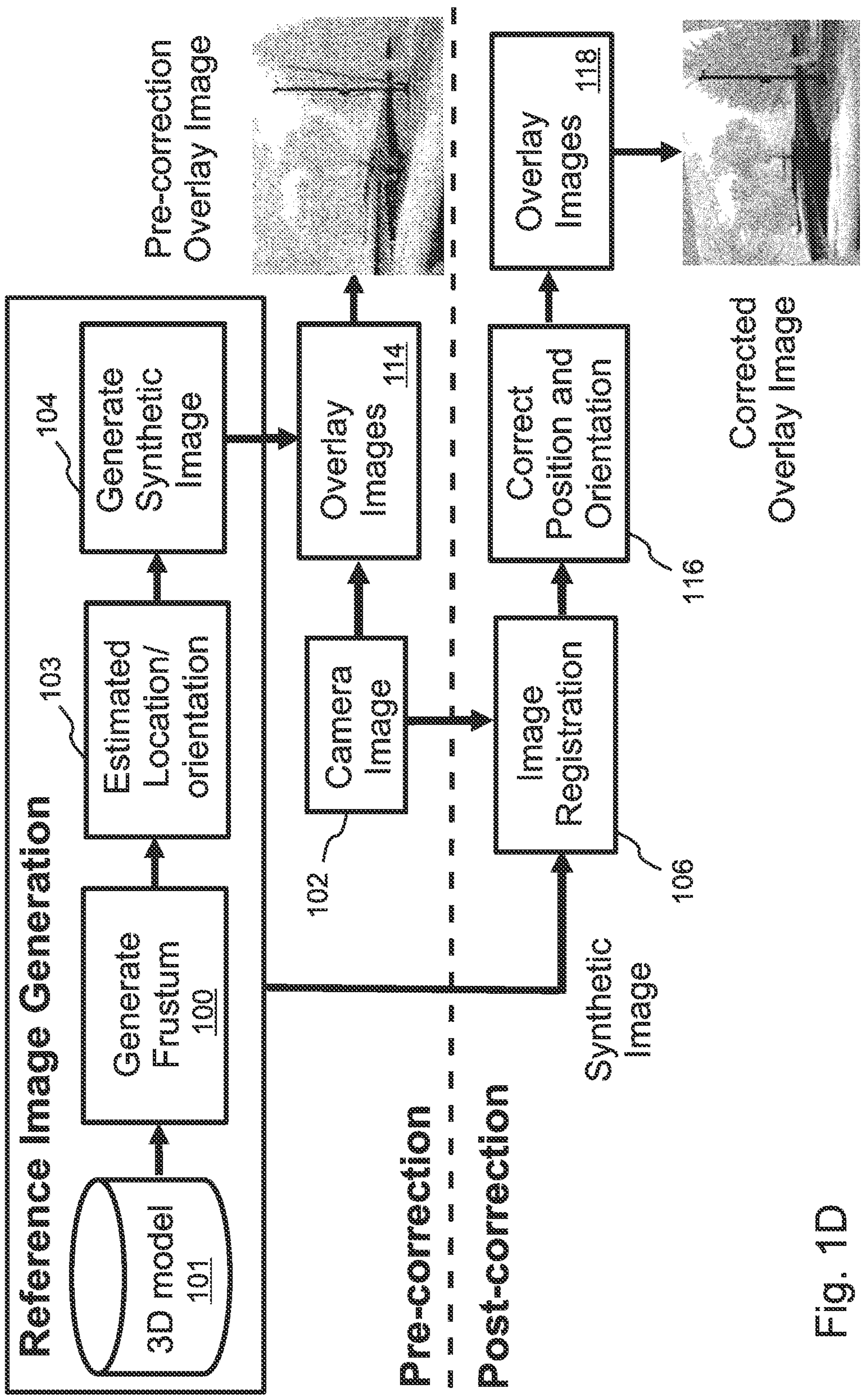
FIG. 1D is a block diagram that illustrates a method embodiment of the present disclosure.

With reference to FIGS. 1C and 1D, according to the disclosed method a 3D, geo-located "frustum" is generated 100 representing the user's anticipated field of view based on an initial estimate 103 of the location and orientation of the user, and on a geo-located 3D model 101 of the environment. Based on this frustum 100, and on the estimated location and orientation of the camera 103, a "synthetic," predicted image is generated 104, and is compared 114 with an actual image obtained 102 by the camera. The two images are then "registered" with each other 106, where "registration" refers to adjusting and refining the estimated location and orientation of the user 116 by estimating a geometric transformation between the two images that places them into alignment, for example through use of a photogrammetric bundle-adjustment process. Based on the adjusted estimate of the user's location and orientation 116, a new frustum 100 and synthetic image 104 are generated, and the new synthetic image is registered with the camera image. This process is repeated until the correspondence between the camera image and the synthetic image is optimized.

FIG. 1D includes overlay images 114, 118 that illustrate the improvement of the image correspondence 118 that results from this registration, as compared to the initial differences between the images 114. In embodiments, the overlay images 114, 118 are presented on a display device to a local or remote operator of the system as an indication of the success of the registration process.

Based on this registration 106, a crude estimate of the user's "downrange" location in the pointing direction of the camera is derived based on pointing vectors from the estimated camera position through the pixels of the camera image to the known locations of elements in the synthetic image, thereby defining a location plane that is perpendicular to the pointing direction. In addition, registration 106 of the camera image with the synthetic image provides a relatively accurate estimate 106 of the orientation and two-dimensional location of the user in this plane, for example from a photogrammetric bundle-adjustment process, which is referred to herein as the "cross-plane" location and orientation of the user.

In an embodiment of the present disclosure, the cross-plane position estimate results from an image registration solution that can be described as follows. Given an estimated position and attitude of the camera coordinate system, i.e. of the "user," the system produces a 3D world view frustum that provides the totality of 3D world points that the camera could possibly see according to the 3D model of the environment. The user position and orientation is calculated based on a known orientation and position of the camera with respect to the platform coordinate frame, and the current estimate of the platform position and attitude from a navigation device such as an Inertial Navigation System (INS) employing an IMU 148. Given the view frustum, a synthetic geo-located image of the scene at the camera's perspective is generated.

Figure 2:
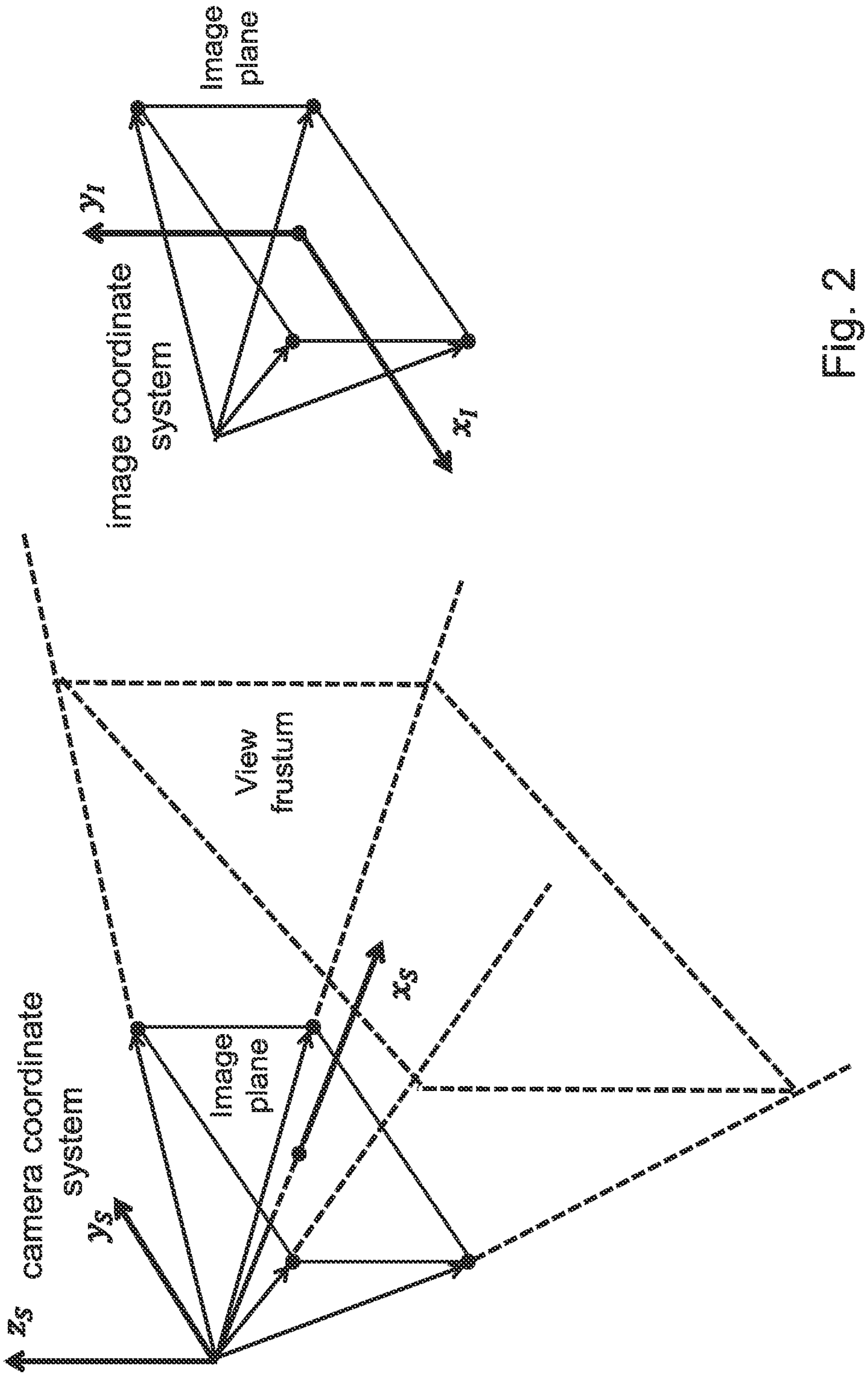
FIG. 2 illustrates camera and image coordinate systems as used in embodiments of the present disclosure.

Details of the embodiment depend on the coordinate system conventions, registration algorithm, and reference scene generation characteristics. FIG. 2 provides one embodiment of coordinate conventions.

The image registration operation aligns the acquired camera image with the synthetic image, and produces a roll angle error estimate $\theta_{ROL}$ (obtained from the registration estimate of image rotation), and pixel coordinate translational offset values $\tau_x$, $\tau_y$. Together with the camera focal length, $f_{LEN}$, the pixel translations are converted to a pointing vector in the camera frame $$\left(x_S^{point}, y_S^{point}, z_S^{point}\right).$$

This pointing vector is used to create yaw and pitch Euler angle corrections, for example, using the coordinate conventions in FIG. 2

$$\theta_{YAW} = \tan^{-1}\left(\frac{y_S^{point}}{x_S^{point}}\right), \tag{1}$$

$$\theta_{PITCH} = -\tan^{-1}\left(\frac{z_S^{point}}{\sqrt{\left(x_S^{point}\right)^2 + \left(y_S^{point}\right)^2}}\right). \tag{2}$$

The three Euler angles $\phi=\theta_{ROL}$, $\psi=\theta_{YAW}$, $\theta=\theta_{PITCH}$, are used to create a transformation matrix $$T_{CAC}^{C}$$

from the correctly-aligned camera (CAC) frame to the original camera (C) frame:

$$T_{CAC}^{C} = \begin{pmatrix} \cos\psi\cos\theta & \cos\psi\sin\theta\sin\phi - \sin\psi\cos\phi & \cos\psi\sin\theta\cos\phi + \sin\psi\sin\phi \\ \sin\psi\cos\theta & \sin\psi\sin\theta\sin\phi + \cos\psi\cos\phi & \sin\psi\sin\theta\cos\phi - \cos\psi\sin\phi \\ -\sin\theta & \cos\theta\sin\phi & \cos\theta\cos\phi \end{pmatrix}. \tag{3}$$

Using camera-to-body frame, $$T_{C}^{B}$$

and body-to-ECEF (Earth-Centered, Earth-Fixed) frame $$T_{B}^{ECEF}$$

transformations, multiplication produces the CAC frame to ECEF rotational transformation $$T_{CAC}^{ECEF} = T_{B}^{ECEF} T_{C}^{B} T_{CAC}^{C}. \tag{4}$$

From the corrected transformation matrix, $$T_{CAC}^{ECEF},$$

corrected Euler angles of the camera frame with respect to the ECEF frame are calculated as $$\theta_{YAW}^{COR} = \tan^{-1}\left(\frac{T_{CAC}^{ECEF}(2, 1)}{T_{CAC}^{ECEF}(1, 1)}\right), \tag{5}$$

$$\theta_{PCH}^{COR} = \sin^{-1}\left(-T_{CAC}^{ECEF}(3, 1)\right), \tag{6}$$

$$\theta_{ROL}^{COR} = \tan^{-1}\left(\frac{T_{CAC}^{ECEF}(3, 2)}{T_{CAC}^{ECEF}(3, 3)}\right). \tag{7}$$

The image registration processing may be viewed as a forward model that takes an initial camera position and attitude, $$\left(x, y, z, \theta_{YAW}^{I}, \theta_{PCH}^{I}, \theta_{ROL}^{I}\right)$$

and produces attitude error angle measurements relative to a reference coordinate system such as the ECEF system $$\left(\theta_{YAW}^{ERR}, \theta_{PCH}^{ERR}, \theta_{ROL}^{ERR}\right) \tag{8}$$

via $$\theta_{YAW}^{ERR} = F_{YAW}\left(x, y, z, \theta_{YAW}^{I}, \theta_{PCH}^{I}, \theta_{ROL}^{I}\right) \tag{9}$$

$$\theta_{PCH}^{ERR} = F_{PCH}\left(x, y, z, \theta_{YAW}^{I}, \theta_{PCH}^{I}, \theta_{ROL}^{I}\right) \tag{10}$$

$$\theta_{ROL}^{ERR} = F_{ROL}\left(x, y, z, \theta_{YAW}^{I}, \theta_{PCH}^{I}, \theta_{ROL}^{I}\right). \tag{11}$$

The attitude error angle measurements represent the attitude angle offset of the camera frame from the true camera frame orientation.

Linearizing the forward model produces $$\begin{pmatrix} \Delta_{YAW} \\ \Delta_{PCH} \\ \Delta_{ROL} \end{pmatrix} = \begin{pmatrix} \frac{\partial F_{YAW}}{\partial x} & \frac{\partial F_{YAW}}{\partial y} & \frac{\partial F_{YAW}}{\partial z} & \frac{\partial F_{YAW}}{\partial \theta_{YAW}} & \frac{\partial F_{YAW}}{\partial \theta_{PCH}} & \frac{\partial F_{YAW}}{\partial \theta_{ROL}} \\ \frac{\partial F_{PCH}}{\partial x} & \frac{\partial F_{PCH}}{\partial y} & \frac{\partial F_{PCH}}{\partial z} & \frac{\partial F_{PCH}}{\partial \theta_{YAW}} & \frac{\partial F_{PCH}}{\partial \theta_{PCH}} & \frac{\partial F_{PCH}}{\partial \theta_{ROL}} \\ \frac{\partial F_{ROL}}{\partial x} & \frac{\partial F_{ROL}}{\partial y} & \frac{\partial F_{ROL}}{\partial z} & \frac{\partial F_{ROL}}{\partial \theta_{YAW}} & \frac{\partial F_{ROL}}{\partial \theta_{PCH}} & \frac{\partial F_{ROL}}{\partial \theta_{ROL}} \end{pmatrix} \begin{pmatrix} \Delta x \\ \Delta y \\ \Delta z \\ \Delta\theta_{YAW} \\ \Delta\theta_{PCH} \\ \Delta\theta_{ROL} \end{pmatrix} \tag{12}$$

or $$z = \mathcal{H}x \tag{13}$$

where $$\Delta x = x^{COR} - x,\ \Delta y = y^{COR} - y,\ \Delta z = z^{COR} - z, \tag{14}$$

$$\Delta\theta_{YAW} = \theta_{YAW}^{COR} - \theta_{YAW}^{I},\ \Delta\theta_{PCH} = \theta_{PCH}^{COR} - \theta_{PCH}^{I},\ \Delta\theta_{ROL} = \theta_{ROL}^{COR} - \theta_{ROL}^{I}, \tag{15}$$

and $$\Delta_{YAW} = 0 - \theta_{YAW}^{ERR},\ \Delta_{PCH} = 0 - \theta_{PCH}^{ERR},\ \Delta_{ROL} = 0 - \theta_{ROL}^{ERR}. \tag{16}$$

In this formulation z represents the measurement, H represents the measurement matrix, and x represents the deviation of the corrected state from the original state estimate. The partial derivatives defined in the measurement matrix can be calculated numerically, for example using first order difference formulas. As an example:

$$\frac{\partial F_{YAW}}{\partial x} = \frac{F_{YAW}\left(x + \delta x, y, z, \theta_{YAW}^{I}, \theta_{PCH}^{I}, \theta_{ROL}^{I}\right) - F_{YAW}\left(x, y, z, \theta_{YAW}^{I}, \theta_{PCH}^{I}, \theta_{ROL}^{I}\right)}{\delta x}. \tag{17}$$

One embodiment formulates and solves a least-squares problem to determine the corrected states. Given measurement z and the measurement model, find x that minimizes $$(z-\mathcal{H}x)^T(z-\mathcal{H}x). \tag{18}$$

The solution is $$x=(\mathcal{H}^T\mathcal{H})^{-1}\mathcal{H}z. \tag{19}$$

The corrected cross-plane position and attitude becomes $$x^{COR}=x+\Delta x,\ y^{COR}=y+\Delta y,\ z^{COR}=z+\Delta z, \tag{20}$$

$$\theta_{YAW}^{COR}=\theta_{YAW}^{I}+\Delta\theta_{YAW},\ \theta_{PCH}^{COR}=\theta_{PCH}^{I}+\Delta\theta_{PCH},\ \theta_{ROL}^{COR}=\theta_{ROL}^{I}+\Delta\theta_{ROL}. \tag{21}$$

The least-squares formulation may be generalized to include prior statistical information on the states and measurement covariance. The generalized formulation consists of minimizing $$(x-\mu)^T M^{-1}(x-\mu)+(z-\mathcal{H}x)^T R^{-1}(z-\mathcal{H}x) \tag{22}$$

where R denotes the measurement covariance matrix, M denotes the covariance matrix in the prior probability distribution on the states, and μ denotes the mean of the prior. The solution is $$x=(M^{-1}+\mathcal{H}^T R^{-1}\mathcal{H})^{-1}(M^{-1}\mu+\mathcal{H}^T R^{-1}z). \tag{23}$$

Downrange Position Estimation

Together with the corrected cross-plane position, the downrange position must be estimated to provide the vision position measurement. With reference again to FIG. 1C, the range sensor is used to refine and improve the initial estimate of the user's downrange location 108 in the pointing direction of the camera 122. In embodiments, the range sensor is fixed in position and orientation relative to the camera, and pre-calibrated, so that data from the range sensor can be accurately applied to pixels of the camera image.

Figure 3:
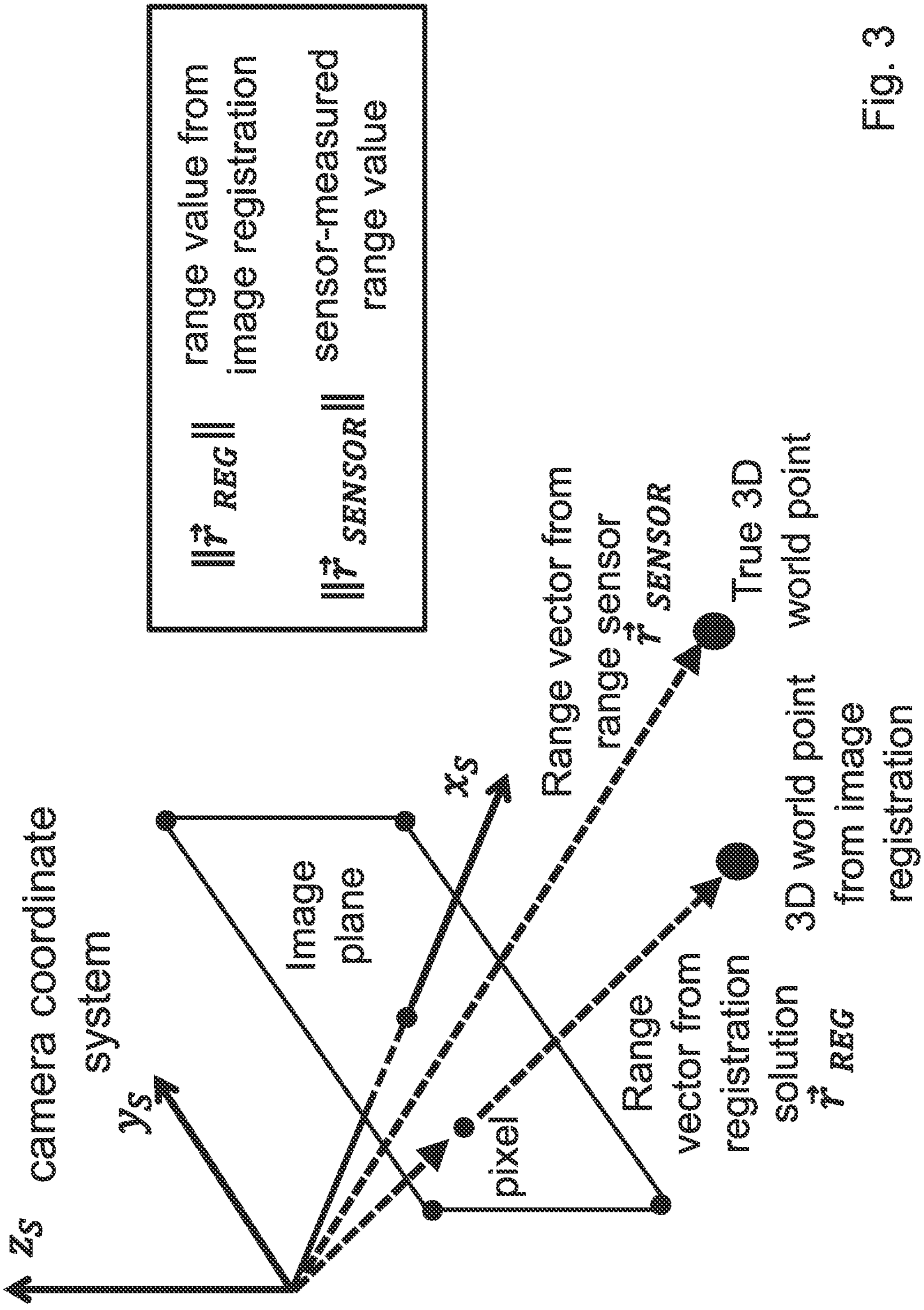
FIG. 3 illustrates estimation of downrange location from image registration according to an embodiment of the present disclosure.

To estimate the downrange position, the system uses an optimization algorithm to minimize a cost function defined on range error values. With reference to FIG. 3, the range error values result from differences between the range values measured by the range sensor, associated to image pixels, and range values of the pointing vectors from the hypothesized camera position through the pixels to the world point positions, obtained from the image registration.

Let $p_i=(x_i, y_i)$ denote image pixel coordinates that associate to range point $r_i$ from the range sensors. That is, $r_i$ represents the range measured by the range sensors to the model point that associates to pixel coordinate $p_i$ via the calibration process between the range sensors and the camera. Hence, $r_i$ represents the range value corresponding to the world point at image pixel coordinates $p_i$.

From the cross-plane registration solution, each image pixel at pixel coordinates $p_i$ corresponds to a geo-located world point $$w_i=(\theta_{LAT,i}^{w},\theta_{LON,i}^{w},h_i^{w}).$$

Denote the assumed camera position geo-coordinates as $$\theta_{LAT}^{CAM},\theta_{LON}^{CAM},h^{CAM}.$$

Convert the camera and world point geo-coordinates to the ECEF frame via $$x_{ECEF}^{CAM}=(\kappa+h^{CAM})\cos\theta_{LAT}^{CAM}\cos\theta_{LON}^{CAM}, \tag{24}$$

$$y_{ECEF}^{CAM}=(\kappa+h^{CAM})\cos\theta_{LAT}^{CAM}\sin\theta_{LON}^{CAM}, \tag{25}$$

$$z_{ECEF}^{CAM}=\kappa(1-\epsilon^2)+h^{CAM}\sin\theta_{LAT}^{CAM} \tag{26}$$

and $$x_{ECEF,i}^{w}=(\kappa+h_i^{w})\cos\theta_{LAT,i}^{w}\cos\theta_{LON,i}^{w}, \tag{27}$$

$$y_{ECEF,i}^{w}=(\kappa+h_i^{w})\cos\theta_{LAT,i}^{w}\sin\theta_{LON,i}^{w}, \tag{28}$$

$$z_{ECEF,i}^{w}=\kappa(1-\epsilon^2)+h_i^{w}\sin\theta_{LAT,i}^{w} \tag{29}$$

where ϵ denotes the first numerical eccentricity from the WGS-84 earth model, R denotes the equatorial radius of the earth, and $$\kappa=\frac{R}{\sqrt{1-\epsilon^2\sin\theta_{LAT}^{CAM})^2}}. \tag{30}$$

The range from the hypothesized camera position to the world point $w_i$ is given by the magnitude of the range vector:

$$x_{ECEF}^{CAM,i}=x_{ECEF,i}^{w}-x_{ECEF}^{CAM}, \tag{31}$$

$$y_{ECEF}^{CAM,i}=y_{ECEF,i}^{w}-y_{ECEF}^{CAM}, \tag{32}$$

$$z_{ECEF}^{CAM,i}=z_{ECEF,i}^{w}-z_{ECEF}^{CAM}, \tag{33}$$

$$\rho_{CAM}^{w_i}=\sqrt{(x_{ECEF}^{CAM,i})^2+(y_{ECEF}^{CAM,i})^2+(z_{ECEF}^{CAM,i})^2}. \tag{34}$$

Create the range error term associated to pixel $p_i$:

$$\Delta_i=|\rho_{CAM}^{w_i}-r_i|. \tag{35}$$

Define the cost function to minimize as $$F(\theta_{LAT}^{CAM},\theta_{LON}^{CAM},h^{CAM})=\sum_i(\Delta_i)^2 \tag{36}$$

where the hypothesized camera position $$\theta_{LAT}^{CAM}, \theta_{LON}^{CAM}, h^{CAM}$$

is constrained to vary along the downrange direction, orthogonal to the corrected camera pointing direction. In ECEF coordinates, the down range direction is characterized by the following line in three-dimensional Euclidean space:

$$x_{ECEF}^{DR} = x_{ECEF}^{CAM} + tv_{ECEF,x}, \quad (37)$$

$$y_{ECEF}^{DR} = y_{ECEF}^{CAM} + tv_{ECEF,y}, \quad (38)$$

$$z_{ECEF}^{DR} = z_{ECEF}^{CAM} + tv_{ECEF,z}, \quad (39)$$

where $$\left(x_{ECEF}^{CAM}, y_{ECEF}^{CAM}, z_{ECEF}^{CAM}\right)$$

is the corrected cross-plane camera position, t is a real-valued parameter, and ($v_{ECEF,x}$, $v_{ECEF,y}$, $v_{ECEF,z}$) is the downrange pointing vector.

Apply an optimization algorithm over the downrange-constrained camera position hypotheses to minimize cost function F. Obtain the downrange adjusted position as the position that minimizes F.

Iterative Vision Measurement Generation

With reference again to FIG. 1C, after the downrange correction 108, the camera attitude angles could incur error due to the adjustment of the camera down range position. Depending on the embodiment, the downrange position adjustment may be small enough to make the incurred pointing angle negligible 110. In this case, one option is to ignore the small attitude angle errors 112. Otherwise, the complete vision measurement procedure can be performed iteratively to progressively remove position and attitude estimation error. The "initial estimate" of the user's location and attitude (orientation) for each iteration of the vision measurement processing would be the estimates that resulted from the previous iteration.

Vision Measurements Covariance Estimation

Vision measurement covariance estimation depends on the characteristics of the application domain and the registration procedure. Some embodiments implement empirically generated covariance, based on statistical distribution modeling resulting from processing training data.

Other embodiments implement correlation-based image registration. A covariance estimate can be provided by fitting a 2D Gaussian to a region of the peak correlation coefficient. The covariance of the fitted Gaussian becomes the measurement covariance for the cross-plane position adjustment. In various embodiments, a downrange position covariance is provided by modeling the shape of the cost function in a neighborhood of the optimum value.

Vision Measurements as Navigation State Corrections

When vision measurements occur infrequently, relative to the drift rate of the IMU 148, the covariance of the IMU 148 greatly surpasses the covariance on the vision measurements. When using a Kalman filter, the state update can be approximated as a decoupled correction of the states by the vision measurement. This covariance imbalance justifies this decoupled approach. The covariance imbalance leads to an approximation of the Kalman filter behavior in the limit as the measurement covariance approaches zero. To see this behavior, consider the following argument.

Consider use of a standard Kalman filter with linear measurement matrix and measurement covariance denoted as $$z = Hx + v, R = \text{cov}(v) \quad (40)$$

with measurement z, measurement matrix H, and Gaussian white noise v with measurement covariance R. Consider the limiting case of a measurement with zero measurement noise $$z = Hx, R = 0. \quad (41)$$

Under this limiting case assumption, the Kalman gain equation becomes $$\begin{aligned} K &= P(-)H^T\left[HP(-)H^T + R\right]^{-1} \\ &= P(-)H^T\left[HP(-)H^T\right]^{-1} \\ &= P(-)H^T\left[H^{T-1}P^{-1}(-)H^{-1}\right] \\ &= H^{-1} \end{aligned}. \quad (42)$$

The Kalman update equation under the simplified Kalman gain assumption becomes $$\begin{aligned} x(+) &= x(-) + K[z - Hx(-)] \\ &= x(-) + H^{-1}[z - Hx(-)] \\ &= x(-) + H^{-1}z - H^{-1}Hx(-) \\ &= H^{-1}z \\ &= H^{-1}(Hx) \\ &= x \end{aligned}. \quad (43)$$

Hence, under the extreme case assumption of zero measurement error, the Kalman filter corresponds to direct state correction.

Integrity Monitoring

Embodiments implement integrity monitoring as a method for detecting corrupted vision measurements that could otherwise degrade performance of downstream processing steps. For example, invalid measurements provided to the navigation filter can lead to corrupted state estimate values and filter divergence.

For embodiments of the disclosed system that comprise a single laser range finder rather than e.g. LIDAR, the returned laser point may not be detected, or may not correspond to a geo-located site model point. In these instances, no geo-location of the incident laser point will be available, thus precluding use of the disclosed downrange position estimation procedure. In some embodiments, when this occurs, the measurements is disregarded, while in other embodiments the cross-plane position measurement and attitude angles are supplied to the navigation filter. In other embodiments that comprise multiple laser range finders, or LIDAR sensors, and thereby obtain a plurality of range measurements, invalid range values can simply be discarded from the set of generated range values, and downrange position estimation can be performed based on the remaining, valid range values.

Figure 4:
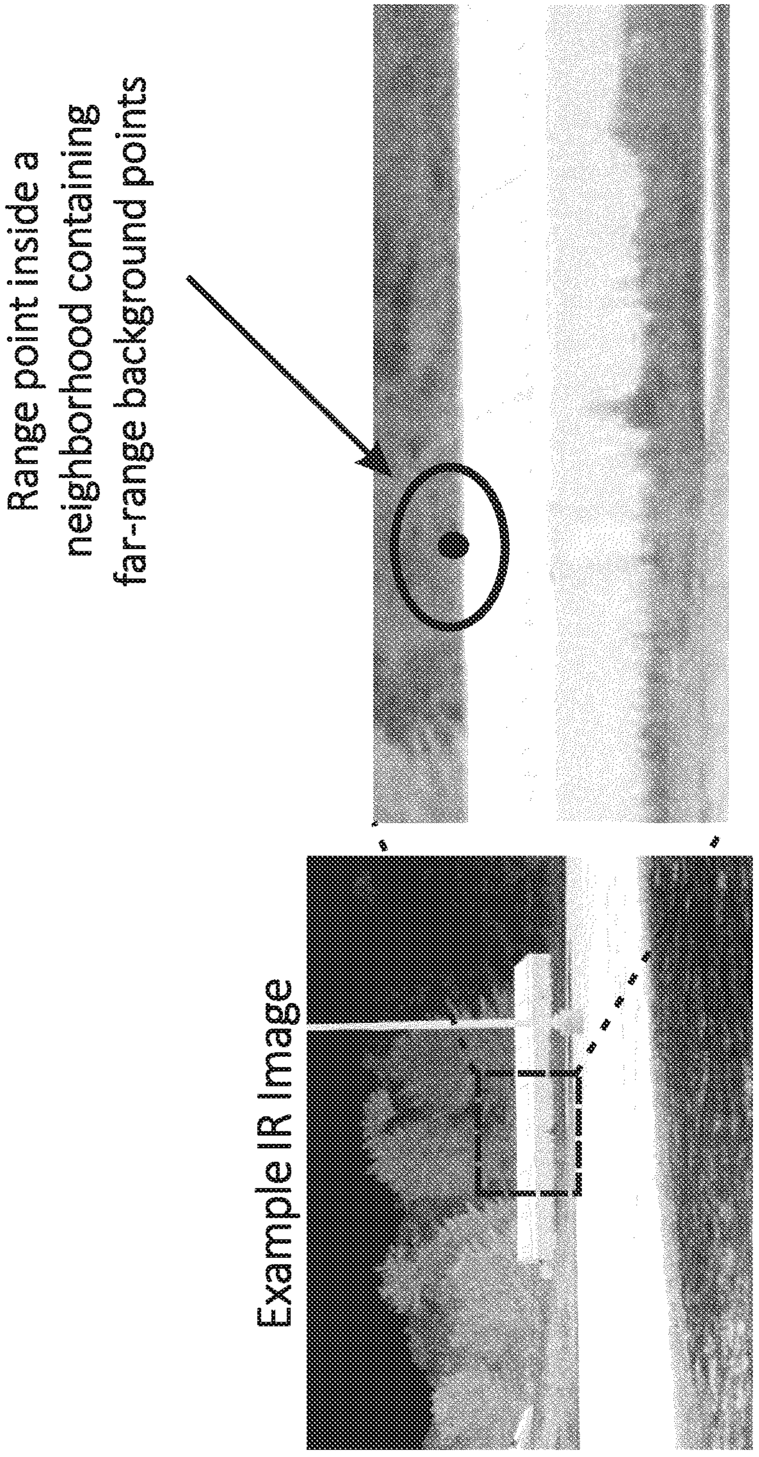
FIG. 4 illustrates a range point in a camera image that overlaps features having widely different downrange locations.

It may occur that a range return corresponds to a 3D world point that exists near a boundary between foreground and background points. Such a case is shown in FIG. 4, in which the model point lies near the apex of the roof of the barn in the scene. A small positional deviation of the estimated location of the point due to sensor error, or processing error could provide large range value discrepancies resulting from choice of a background point.

To detect this range disparity failure mode, an uncertainty ellipse defined about the image pixel corresponding to the returned range value, and a measure of range value deviation, for example a maximum deviation value or a standard deviation of range values corresponding to pixels within the uncertainty ellipse, can be generated. Range values can then be rejected for which the deviation within the uncertainty ellipse exceeds a defined range disparity threshold value.

In some embodiments, so as to further mitigate effects of range uncertainty within the uncertainty ellipse, on the downrange estimation processing, the range values are averaged to produce a minimum variance range estimate. Averaging can be performed over the entire uncertainty ellipse, or under a smaller, pullback region.

Once the location and orientation of the user has been accurately determined, it is used to direct movements of the user, i.e. for navigation, for providing location information to the user for situational awareness purposes, and/or for pointing of a directional device such as a projectile weapon. In some embodiments, the camera 122 is fixed to a weapon 120, such as a weapon that is carried by a soldier 118, or at least a location and orientation of a weapon relative to the camera is known, so that the location and orientation of the weapon is also determined. In some of these embodiments, the weapon position and orientation information is transmitted wirelessly to a central computer server for determining simulated target hits, for example in an infantry training system. In other of these embodiments, the position and orientation of the weapon is used to initialize a simulated ballistics trajectory which may be displayed to the user on a display device.

In embodiments, little or no hardware is required beyond what is already present in fulfilment of other requirements. For example, as illustrated in FIG. 1A, the camera 122 and the range sensor 124 may both be part of a pointing system 128 of a weapon 120 carried by a soldier 118. In similar embodiments, the camera 122 and range sensor 124 are mounted on a UAV or other platform. Or, the camera 122 and the range sensor 124, for example a LIDAR, may be incorporated into a civilian autonomous vehicle as part of a collision avoidance system. Similarly, the IMU 148 may be incorporated together with a GPS as a portable navigation system carried by an individual, a UAV, or a similar platform. In some embodiments, the disclosed method is used to augment the capability of weapon scopes 128 using video cameras 122 and laser range sensors 124 for targeting. Using the method disclosed herein, these systems can be augmented to perform full vision aided navigation, thereby leveraging a pre-existing system to additionally perform navigation in a GPS-challenged region.

The foregoing description of the embodiments of the disclosure has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the disclosure to the precise form disclosed. Many modifications and variations are possible in light of this disclosure.

Although the present application is shown in a limited number of forms, the scope of the disclosure is not limited to just these forms, but is amenable to various changes and modifications. The discussion presented herein does not explicitly disclose all possible combinations of features that fall within the scope of the disclosure. The features disclosed herein for the various embodiments can generally be interchanged and combined into any combinations that are not self-contradictory without departing from the scope of the disclosure. In particular, the limitations presented in dependent claims below can be combined with their corresponding independent claims in any number and in any order without departing from the scope of this disclosure, unless the dependent claims are logically incompatible with each other.

What is claimed is:

1. A method of determining a location and orientation within an environment of an apparatus that comprises a controller, a camera, and an associated range sensor, referred to herein as the "position" of the apparatus, the method comprising:

A) determining an initial position estimate of the apparatus;

B) determining by the controller of a 3D geo-located frustum representing an anticipated field of view of the camera, wherein the 3D geo-located frustum is based on the initial position and a three-dimensional geo-located model (3D model) of the environment of the camera;

C) causing, by the controller, the camera to obtain a camera image of the camera's field of view;

D) generating, by the controller, a synthetic image of the anticipated field of view of the camera, wherein the synthetic image is a prediction of the camera image according to the initial position estimate of the apparatus and the frustum;

E) registering, by the controller, the synthetic image of the anticipated field of view with the camera image, thereby determining an estimate of a "cross-plane" position of the apparatus in a plane perpendicular to a pointing direction of the camera, and a first estimate of a "downrange" position of the apparatus in the pointing direction of the camera, wherein said registering comprises:

a) estimating a geometric transformation between the synthetic image of the anticipated field of view and the camera image of the camera's field of view that optimizes their mutual alignment;

b) revising, by the controller, the position estimate of the apparatus according to the estimated geometric transformation;

c) adjusting, by the controller, the synthetic image according to the revised position estimate; and d) repeating steps a) through c) until a correspondence between the camera image and the synthetic image is optimized;

F) causing, by the controller, the range sensor to obtain at least one downrange measurement in the pointing direction of the camera;

G) determining, by the controller, a second downrange estimate using the first downrange estimate and the at least one downrange measurement by minimizing a cost function defined on range error values, the second downrange estimate being more accurate than the first downrange estimate; and H) causing by the controller, according to the cross-plane and second downrange estimates, at least one of:

navigating to a new position;

adjusting a location and orientation of a device; and presenting the cross-plane and refined downrange estimates to an operator of the apparatus.

2. The method of claim 1, further comprising, between steps G) and H), determining, by the controller, a peak correlation coefficient representing a correspondence between the camera image and the synthetic image, comparing the peak correlation coefficient to a specified threshold, and, if the peak correlation coefficient is below the specified threshold, repeating steps D) through G).

3. The method of claim 1, wherein the apparatus is a vehicle.

4. The method of claim 1, wherein the apparatus is a rifle, and wherein step H) includes pointing the rifle at a target according to the cross-plane and second downrange estimates.

5. The method of claim 1, wherein the camera is an electro-optical or infrared imaging system.

6. The method of claim 1, wherein the range sensor is a laser range finder or a Light Detection and Ranging apparatus (LIDAR).

7. The method of claim 1, wherein step A) includes determining the initial position estimate of the apparatus based, at least in part, on readings from an inertial measurement unit (IMU).

8. The method of claim 1, wherein step A) includes determining the initial position estimate of the apparatus based, at least in part, on a most-recent reading from a global positioning system (GPS).

9. The method of claim 1 wherein, in step G), the first estimate of the downrange position is based on pointing vector angles from the estimated camera position through the pixels of the camera image to known locations of elements in the synthetic image.

10. The method of claim 1, wherein in step E), registering the synthetic image with the camera image includes applying a photogrammetric bundle-adjustment process to estimate the geometric transformation between the synthetic image of the anticipated field of view and the camera image of the camera's field of view.

11. A system comprising:

a camera having a pointing direction and a field of view centered about the pointing direction;

a range sensor having a known location and orientation relative to the camera; and a controller configured to cause the camera to obtain a camera image of the field of view centered about the pointing direction, and to cause the range sensor to obtain a downrange measurement in the pointing direction of the camera, the controller being further configured to:

A) receive or determine an initial position estimate of the apparatus;

B) based on the initial position estimate and a three-dimensional geo-located model (3D model) of the environment, determine, by the controller, a 3D, geo-located frustum representing an anticipated field of view of the camera;

C) cause the camera to obtain a camera image of the camera's field of view;

D) generate a synthetic image of the anticipated field of view, wherein the synthetic image is a prediction of the camera image according to the initial position estimate and the frustum;

E) register the synthetic image with the camera image, thereby determining an estimate of a "cross-plane" position of the apparatus in a plane perpendicular to a pointing direction of the camera, and a first estimate of a "downrange" position of the apparatus in the pointing direction of the camera, wherein said registering comprises:

a) estimating a geometric transformation between the synthetic image of the anticipated field of view and the camera image of the camera's field of view that optimizes their mutual alignment;

b) revising the position estimate according to the estimated geometric transformation;

c) adjusting the synthetic image according to the revised position estimate; and d) repeating steps a) through c) until a correspondence between the camera image and the synthetic image is optimized;

F) cause the range sensor to obtain at least one downrange measurement in the pointing direction of the camera;

G) determine a second downrange estimate using the first downrange estimate and the at least one downrange measurement by minimizing a cost function defined on range error values, the second downrange estimate being more accurate than the first downrange estimate; and H) cause, according to the cross-plane and second downrange estimates, at least one of:

cause navigating to a new position;

cause adjusting of a location and orientation of a device; and cause presenting the cross-plane and refined downrange estimates to an operator of the apparatus.

12. The system of claim 11, wherein between steps G) and H), if agreement a peak correlation coefficient representing a correspondence between the camera image and the synthetic image is below a specified threshold, the controller is further configured to repeat steps D) through G).

13. The system of claim 11, wherein the apparatus is a vehicle.

14. The system of claim 11, wherein the apparatus is a rifle, and wherein step H) includes pointing the rifle at a target according to the cross-plane and second downrange estimates.

15. The system of claim 11, wherein the camera is an electro-optical or infrared imaging system.

16. The system of claim 11, wherein the range sensor is a laser range finder or a Light Detection and Ranging apparatus (LIDAR).

17. The system of claim 11, wherein the system further includes an inertial measurement unit (IMU), and wherein in step A) the controller is configured to determine the initial position estimate of the apparatus based, at least in part, on readings from the IMU.

18. The system of claim 11, wherein the system further includes a global positioning system (GPS), and wherein in step A) the controller is configured to determine the initial position estimate of the apparatus based, at least in part, on a most-recent reading from the GPS.

19. The system of claim 11 wherein, in step E), the controller is configured to derive the first estimate of the downrange position based on pointing vectors from the estimated camera position through the pixels of the camera image to known locations of elements in the synthetic image.

20. The system of claim 11, wherein in step E), the controller is configured to apply a photogrammetric bundle-adjustment process to estimate the geometric transformation between the synthetic image of the anticipated field of view and the camera image of the camera's field of view as part of registering the synthetic image with the camera image.

* * * * *